United States Patent [19]
Pemberton et al.

[11] Patent Number: 5,641,245
[45] Date of Patent: Jun. 24, 1997

[54] APPARATUS FOR PASSIVE REMOVAL OF SUBSURFACE CONTAMINANTS

[75] Inventors: Bradley E. Pemberton, Aiken, S.C.; Christopher P. May, Fairfax, Va.; Joseph Rossabi, Aiken, S.C.

[73] Assignee: Westinghouse Savannah River Company, Inc., Aiken, S.C.

[21] Appl. No.: 446,372

[22] Filed: May 22, 1995

[51] Int. Cl.⁶ .................................................. B09B 3/00
[52] U.S. Cl. .......................... 405/128; 405/131; 405/258; 166/266; 166/370; 166/372; 588/249
[58] Field of Search ............................... 405/128, 129, 405/258; 137/533.11, 236.1; 52/169.5; 166/370, 372, 266, 267

[56] References Cited

U.S. PATENT DOCUMENTS

| | | |
|---|---|---|
| 321,829 | 7/1885 | Mackley et al. ............... 137/533.11 X |
| 2,251,244 | 7/1941 | Stanley ............................. 166/370 |
| 3,675,720 | 7/1972 | Sizer ................................. 166/371 |
| 3,863,714 | 2/1975 | Watson, Jr. . |
| 3,980,138 | 9/1976 | Knopik . |
| 4,026,355 | 5/1977 | Johnson et al. . |
| 4,183,407 | 1/1980 | Knopik . |
| 4,393,928 | 7/1983 | Warnock, Sr. . |
| 4,435,292 | 3/1984 | Kirk et al. ....................... 405/128 X |
| 4,624,176 | 11/1986 | Stenke .......................... 137/533.11 X |
| 4,745,850 | 5/1988 | Bastian et al. .................. 405/128 X |
| 4,882,071 | 11/1989 | Bench et al. .................... 210/747 |
| 4,945,988 | 8/1990 | Payne et al. ..................... 166/266 |
| 4,954,266 | 9/1990 | Lingo, Jr. ......................... 210/747 |
| 5,012,867 | 5/1991 | Kilgore . |
| 5,076,727 | 12/1991 | Johnson et al. ................. 405/128 |
| 5,137,049 | 8/1992 | Orlowski ...................... 137/533.11 |
| 5,161,914 | 11/1992 | Rahn et al. . |
| 5,172,764 | 12/1992 | Hajali et al. ..................... 166/267 |
| 5,246,309 | 9/1993 | Hobby ............................. 405/128 |
| 5,249,888 | 10/1993 | Braithwaite et al. ........... 405/128 |
| 5,251,700 | 10/1993 | Nelson et al. ................ 405/128 X |
| 5,252,000 | 10/1993 | Mohs ............................... 405/53 |
| 5,271,693 | 12/1993 | Johnson et al. ................. 405/128 |
| 5,288,169 | 2/1994 | Neeper . |
| 5,318,116 | 6/1994 | Vinegar et al. .............. 405/128 X |
| 5,332,333 | 7/1994 | Bentley ............................ 405/128 |
| 5,337,773 | 8/1994 | Michael ....................... 137/236.1 X |
| 5,358,357 | 10/1994 | Mancini et al. ................. 405/128 |

*Primary Examiner*—Dennis L. Taylor
*Attorney, Agent, or Firm*—Hardaway Law Firm P.A.

[57] ABSTRACT

An apparatus is provided which passively removes contaminated gases from a subsurface. The apparatus includes a riser pipe extending into a subsurface which has an exterior end in fluid communication with a valve. When well pressure is greater than atmospheric pressure, the valve opens to release contaminants into the atmosphere, and when well pressure is less than atmospheric pressure, the valve closes to prevent flow of air into the well. The valve assembly of the invention comprises a lightweight ball which is lifted from its valve seat with a slight pressure drop between the well and the atmosphere.

20 Claims, 3 Drawing Sheets

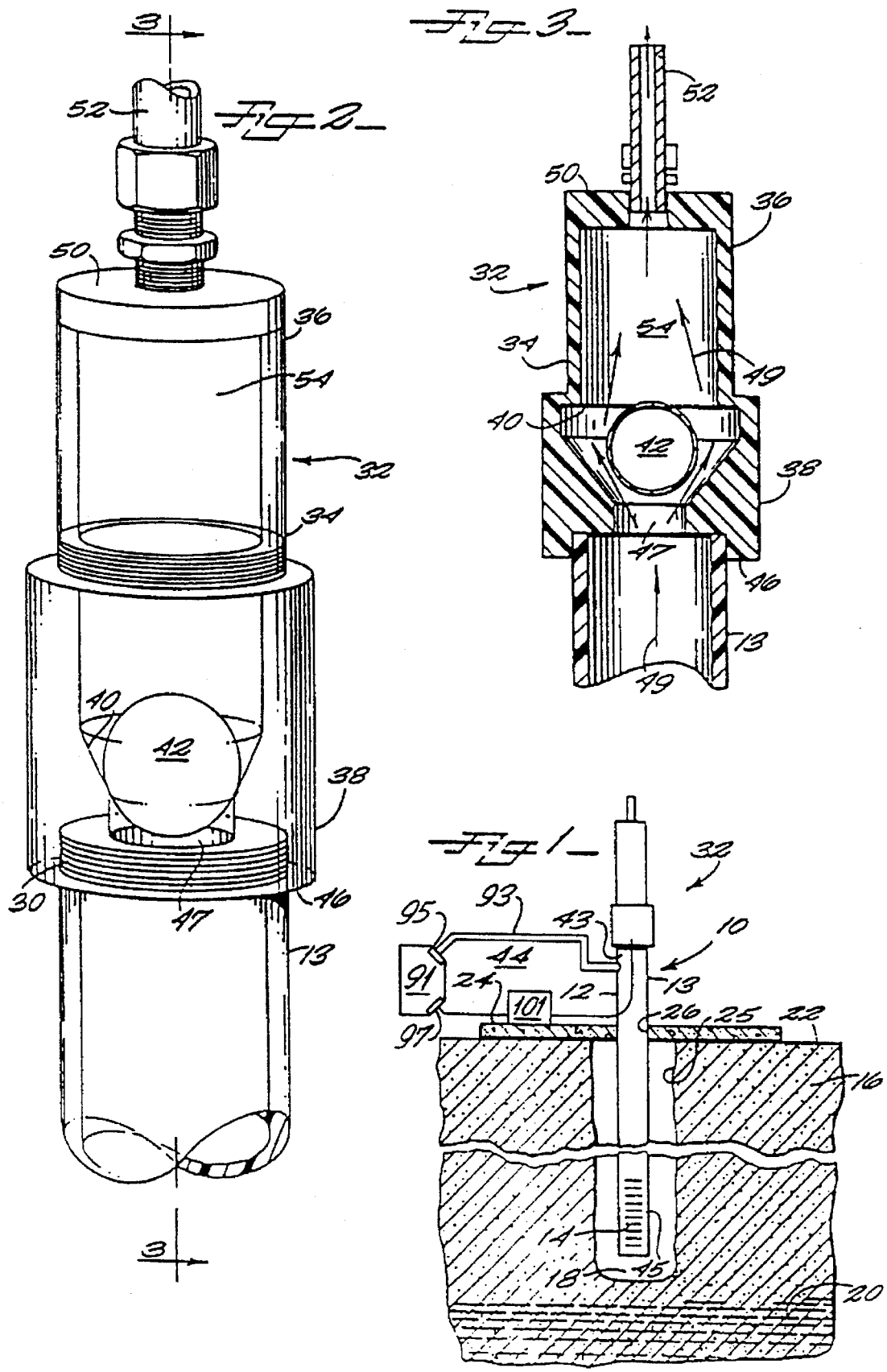

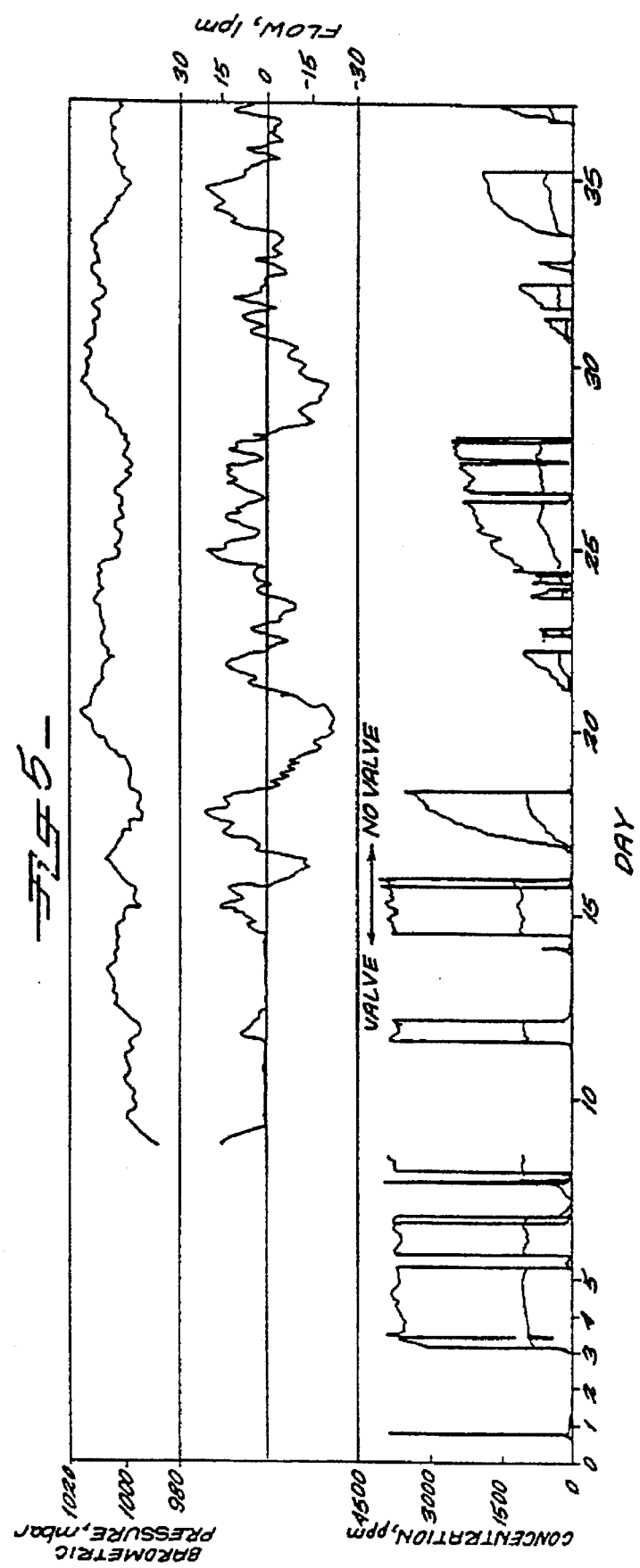

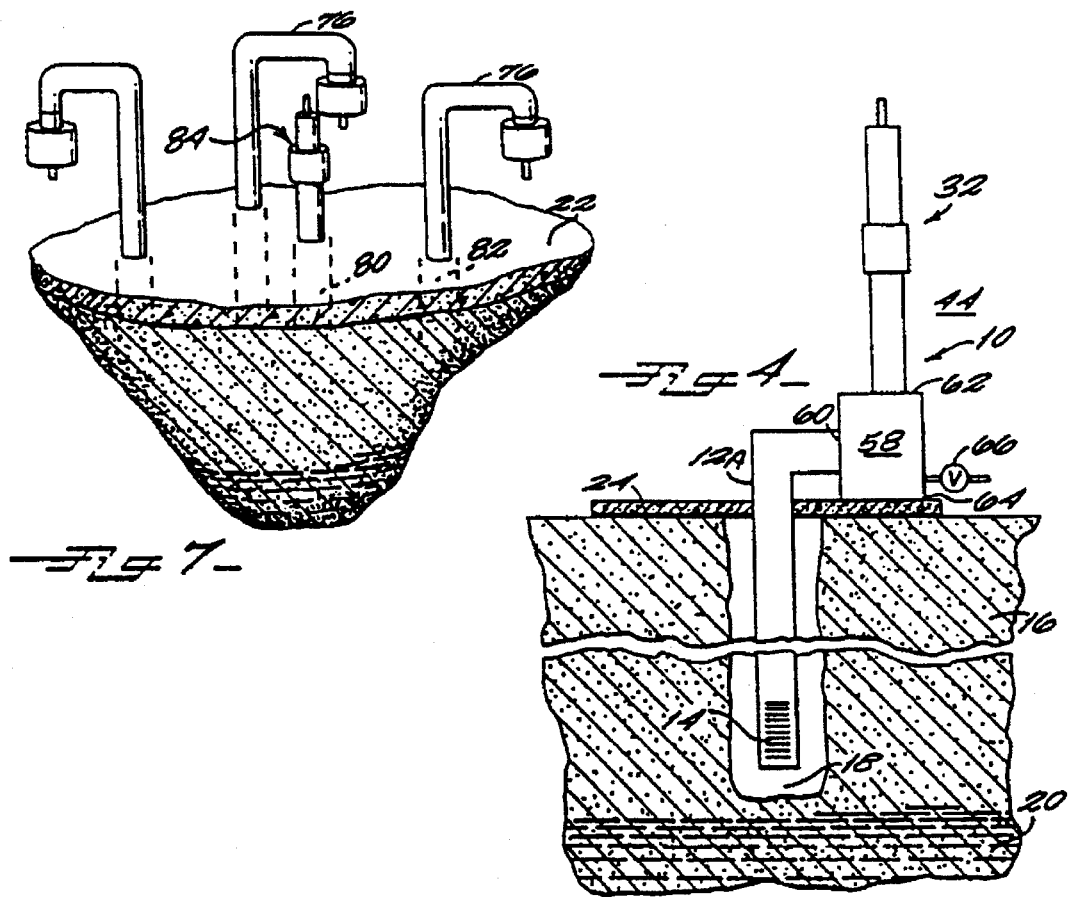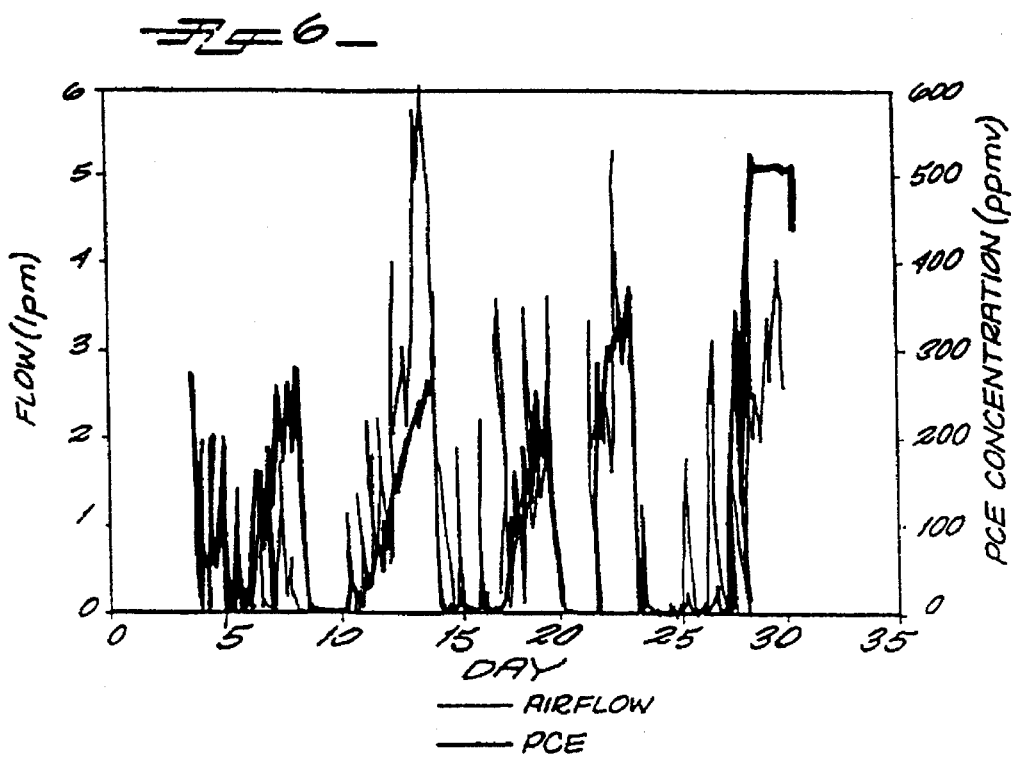

5,641,245

APPARATUS FOR PASSIVE REMOVAL OF SUBSURFACE CONTAMINANTS

The United States Government has rights in this invention pursuant to Contract No. DE-AC09-89-SR18035 between the U.S. Department of Energy and Westinghouse Savannah River Company.

FIELD OF THE INVENTION

The invention relates to an apparatus for removing underground contaminants, and more particularly, to an apparatus which passively removes contaminated vapors from an area of subsurface without application of outside mechanical force.

DISCUSSION OF BACKGROUND

Potentially harmful vapors and liquids are commonly found in areas of subsurface at chemical production facilities, manufacturing facilities, waste storage facilities, abandoned seepage basins, and at areas surrounding leaking sewer lines or other production lines or piping. Contaminants accumulate at and below the water table in the subsurface in such areas, but are also found, in gaseous and liquid form, at the "vadose zone" of the subsurface, the region of the subsurface above the water table. In industrial facilities, volatile organic compounds are common in the vadose zone of the subsurface.

Various devices and apparatuses are known for removing contaminants from the subsurface.

Existing apparatuses for removing subsurface gases and liquids, however, require application of outside forces and/or inputs. The apparatuses of U.S. Pat. Nos. 5,358,357, 5,172,764, 5,332,333, and 4,945,988 employ pumps for drawing fluid out of a subsurface and the apparatus of U.S. Pat. No. 3,980,138 employs a fan in order to draw fluid out of a subsurface.

Existing apparatuses for use in extracting underground contaminants are often complicated and costly to produce. They require an artificial energy source and must be activated for operation. Further, they require continuous maintenance and frequent replacement of component parts. Still further, contaminant removal rate is limited by diffusion and desorption of the contaminant through the subsurface pore structure. Active apparatuses apply more pumping force than is necessary to remove contaminants at a maximum rate and thus waste energy.

For mass removal of contaminants from a large area of contaminated subsurface, it is common practice to deploy a plurality of contaminant-removal apparatuses over the area. Obviously, problems of construction cost, energy consumption, operation costs, maintenance costs, and energy waste become increasingly significant when a system is deployed comprising several contaminant removal units.

In view of the above, there is a need for a low maintenance apparatus that removes underground contaminants inexpensively, and without application of outside mechanical force.

SUMMARY OF THE INVENTION

According to its major aspects and broadly stated, the present invention is an apparatus which extracts contaminants from underground locations by utilizing natural fluctuations in ambient atmospheric pressure. The apparatus comprises means for sealing a well when atmospheric pressure is high, and means for opening a well when atmospheric pressure is low. Essentially, the invention is an apparatus that allows a well to "breath out" contaminants during periods of low atmospheric pressure.

The apparatus includes a riser pipe extending through a well into the ground and includes a perforated section at a specific position above the water table. The perforated section is oriented near where contaminants are most likely present and where the subsurface is permeable to fluid flow. A section of the riser pipe extends upward above the ground and is in fluid communication with a valve. The valve is formed to have a low cracking pressure and is responsive to changes in ambient atmospheric pressure, the air pressure at the surface.

Included in a preferred embodiment of the valve is a vertically oriented chamber having a cone-shaped valve seat. A ball is disposed in the chamber and rests on the valve seat in the absence of a pressure differential across the valve assembly. Cracking pressure, the pressure required to lift the ball, is related to the density or weight and surface area of the ball and is preferably no more than about 1 mbar.

When the pressure in the well is greater than atmospheric pressure, the ball is lifted from its seat, and contaminated vapors are allowed to escape from the well. When the pressure in the well is less than atmospheric pressure, the ball valve forms a seal with the valve seat, and air is prevented from entering the well.

The apparatus may further include a condenser, which when in use, is installed in the line between the well and the valve assembly. Deployed in situations where the apparatus may encounter cold temperatures, the condenser condenses gases (e.g., water vapor) which otherwise would condense at the valve chamber and might freeze, rendering the valve inoperable.

Fluctuations in ambient barometric pressure control operation of the apparatus. The pressure continuum in the subsurface follows the pressure continuum in the atmosphere, but in the subsurface pressure is damped in amplitude and delayed in time because of the fluid dissipate properties of the subsurface. When atmospheric pressure is low in relation to subsurface pressure, the valve is opened, and air and contaminants in the vapor phase are forced out of the well in the resultant gas flow.

The apparatus can be configured to inject heat and nutrients into a subsurface for bioremediation of a subsurface. By disconnecting the riser pipe from the inlet of the valve and then reconnecting it to the valve exhaust, the apparatus will seal a well when well pressure is greater than atmospheric pressure and will open to allow air to be "injected" into a subsurface when atmospheric pressure is greater than well pressure.

Several apparatuses configured to inject heat and nutrients into a well can be employed in a bioremediation and contaminant removal system. In such a system, a normally-configured apparatus configured to extract contaminants from a subsurface is installed at a center well, and a plurality of apparatuses configured for injection are installed at wells surrounding a center well. The apparatuses in the outer wells inject heat and nutrients into the subsurface during high pressure periods, and direct contaminants toward the center well, which are released through the apparatus at the center well.

A major feature of the invention is the valve having a seated ball weighted to provide a low cracking pressure. The valve provides passive release of contaminants from a well with minimal construction costs, minimal maintenance costs, minimal operation costs, and no energy consumption.

The valve further prevents flow of air into a well, and thereby increases the amount of contaminants that are released during periods of low pressure by preventing dilution of contaminants in the well. By configuring the apparatus such that the valve's exhaust is in fluid communication with the riser pipe, the valve can provide for the injection of heat and nutrients into a subsurface during periods of high atmospheric pressure.

Another major feature of the invention is the riser pipe having a perforate section that extends downward into a well. The perforate section can be positioned in a highly contaminated area of subsurface so that, during periods of low atmospheric pressure, contaminants are forced by a pressure differential between the well and the atmosphere through the perforate section and then through the riser pipe.

Another important feature of the invention is the visual observation means of the valve. The valve is transparent, semi-transparent, or is formed to have a window, so that malfunctioning of the apparatus can be visually observed.

Still another important feature of the invention is the condenser which can be formed in-line between a well and a valve assembly in accordance with the invention. The condenser condenses gases which otherwise would condense at, and possibly freeze at, the valve assembly in times of cold weather.

Other features and advantages of the apparatus will become apparent to those skilled in the art of underground contaminant removal from a careful reading of the Detailed Description of Preferred Embodiment accompanied by the following drawings.

BRIEF DESCRIPTION OF THE DRAWINGS

In the drawings, wherein like numerals are used to indicate identical elements,

FIG. 1 illustrates the apparatus according to a preferred embodiment, shown as installed in a well of subsurface.

FIG. 2. is a perspective view of a preferred embodiment of the valve assembly.

FIG. 3 is a cross sectional view taken along line 3—3 of FIG. 2.

FIG. 4 illustrates another embodiment of the apparatus according to the invention having an in-line condenser.

FIG. 5 is a graph illustrating the effect of removing a valve according to the invention from a well riser pipe.

FIG. 6 is a graph illustrating the effect of installing a valve according to the invention on a well riser pipe.

FIG. 7 shows a system employing several apparatuses according to the invention, including a center apparatus and outer apparatuses having valves configured for injecting heat and nutrients into a subsurface.

DETAILED DESCRIPTION OF PREFERRED EMBODIMENTS

FIG. 1 shows the apparatus in use situated in a well. Apparatus 10 includes a riser pipe 12 having a perforate section 14. Riser pipe 12 extends downward into subsurface 16 through a well 18 to a point above the water table 20. Perforate section 14 of pipe 12 is positioned in an area of subsurface having a high concentration of contaminants. "Contaminant" shall herein mean any unwanted gas existing in a vadose zone of a subsurface. Perforations 14 in riser pipe 12 may be horizontal or vertical slits or holes formed in riser pipe 12, or may be formed by cutting away a section of riser pipe 12 and affixing a screen over the cutaway section.

At surface 22, a well head is formed which seals riser pipe 12 to surface 22 so that no air can escape from or enter well 18. Preferably, the well head comprises a layer of concrete 24 covering well, which has a penetration 26 for receiving riser pipe 12. Before the well head is formed, area in well 18 between well wall 25 and riser pipe 12 may be packed with sand, bentonite and/or grout as is well known to those skilled in the art. A seal (not shown) may be interposed between riser pipe 12 and well head penetration 26. Riser pipe 12 may be formed of virtually any solid material, but is preferably formed of a non-corrosive material that does not absorb gaseous contaminants. Preferred materials for riser pipe 12 include stainless steel, Teflon and polyvinyl chloride (PVC).

Top end 13 of riser pipe 12 terminates above the well head at a pipe end 30 formed to engage a valve 32 according to the invention.

Now referring to FIG. 2, a preferred embodiment of a valve 32 according to the invention will be described in detail. Valve 32 comprises a chamber 34 having a top 36 and bottom 38. Formed at chamber bottom 38 is a valve seat 40 which receives a ball 42. Valve seat is preferably cone-shaped to ensure effective contact and sealing between ball and seat, but also may be a ring which receives ball 42. A cone-shaped (frustroconical) valve seat is preferred for the further reason that moisture or small particles appearing on a cone-shaped seat 40 tend to slide off seat 40 and into riser pipe, and do not readily build up on seat 40. Valve seat 40 may be formed as a separate component by a process of injection molding and then installed in chamber 34 or may be formed by machining away an area of solid material in chamber 34.

Ball 42 of chamber 34 is formed to be lightweight so that a slight pressure drop between well 18 and atmosphere 44 causes ball 42 to be lifted from seat 40. Ball 42 is formed of a lightweight material having a smooth outer surface which can form a seal with seat 40. Preferred materials for ball 42 are synthetic plastics. Ball 42 may be a commercially available table tennis ball.

Chamber 34, like riser pipe 12, should be made of a non-corrosive, non-absorbent material such as stainless steel, Teflon, or polyvinyl chloride. Preferably, chamber 34 is made of a transparent or semi-transparent material or is formed to have a window, so that valve 32 can be visually monitored for proper operation. Valve seat 40 of chamber 34 may be of the same material as the rest of chamber, but can be made of a soft and resilient material (silicones, robbers, etc.) for increasing the sealing action between ball 42 and seat 40.

Cracking pressure, the pressure causing ball 42 to separate from seat 40, is dependent on the density or weight and surface area of ball 42. Cracking pressure should be as low as is possible, so that any pressure drop between well 18 and atmosphere 44 will cause ball 42 to separate from seat 40, but a valve having a higher cracking pressure, up to about 30 mbar (equivalent to the difference between maximum and minimum ambient atmospheric pressure) or more will also be useful in an apparatus for extracting contaminants from a subsurface. When ball 42 is provided by a table tennis ball, cracking pressure is about 1 mbar. That is, a 1 mbar pressure difference between well 18 and atmosphere 44 will crack valve 32, with well pressure measured from riser pipe interior 43 which, when valve 32 is closed, will equal well pressure at perforate section 45 of riser pipe 12. "Atmospheric pressure" herein refers to the air pressure of atmosphere 44, the area above surface 22, and "well pressure"

herein refers to air pressure in well 18 at the region of the perforate section 45 of riser pipe 12.

Valve seat 40 comprises a hole 47 through which a stream of air flows when valve 32 is cracked. Air stream, indicated generally by 49 of FIG. 3, helps to lift ball 42 and can be accelerated to enhance ball lifting by narrowing the diameter of hole 47 or by narrowing the top end 13 of riser pipe 12. However, acceleration of air stream 49 is normally not necessary, and it is preferred that hole 47 of valve seat not be narrower than is necessary to support ball 42. Further, it is most often preferred that riser pipe 12 have a substantially constant diameter from bottom to top. If riser pipe 12 has a substantially constant width and does not have a narrowed top end 13 near valve 32, then there will be a minimum pressure drop in riser pipe before valve 32, and a maximum volume of contaminants will be released through riser pipe 12.

It is recognized that if atmospheric pressure is greater than well pressure, then ball 42 will be forced downward to form a seal between ball 42 and seat, and essentially no air will enter into well through riser pipe 12.

In the embodiment of FIG. 2, it is seen that bottom end 46 of chamber is formed to threadably receive end 30 of riser pipe 12 and that chamber bottom 38 is threadably received by chamber top 36. Top end 50 of chamber 34 is formed to threadably receive an exhaust pipe 52 through which contaminated gases from well 18 exit into the atmosphere. Exhaust pipe 52 may be bent so that precipitation does not easily enter valve assembly through exhaust pipe 52, and may have a screen or barrier disposed therein so that insects cannot easily enter chamber 34 through exhaust pipe 52. The modularity of the valve assembly makes the assembly easy to assemble and easy to disassemble. Disassembly and reassembly of the assembly may be required, in limited instances, for maintenance purposes. Although such instances are expected to be rare, it is expected that a foreign body may appear in chamber or ice may form in chamber 34 such that ball 42 cannot rise or else cannot seal with seat 40. Given the assembly's modularity, it is seen that assembly 32 can be easily disassembled, repaired, cleaned and restored to operation if such problems arise. Moreover, since chamber 34 includes means for visual observation of chamber interior 54, such problems are easily detected.

Valve assembly 32 of the invention may also be provided by a solenoid or otherwise mechanical valve assembly, wherein a valve is actuated by a spring, a motor, or an otherwise mechanical means requiring a power source. In such an embodiment, configuration of the valve is not important, and operation of the valve is controlled with pressure sensors and control circuitry in communication with the valve. In order for the mechanical valve assembly to be responsive to changes in ambient atmospheric pressure, a differential pressure sensor can be provided. A differential pressure sensor 91, which may be a series PX160 (OMEGA) differential pressure sensor, may be positioned above surface 22 near riser pipe. 12. A tube 93 can be connected from top end 13 of riser pipe 12 to a first pressure port 95 of the differential pressure sensor, and a second pressure port 97 of the differential pressure sensor can be exposed to atmosphere 44. The tube connecting riser pipe 12 and a differential pressure sensor can be installed in riser pipe 12 by first drilling a hole in a wall of riser pipe 12, installing a tube fitting, such as a (SWAGELOK) tube fitting in the hole, and then installing the tube into the fitting. When the valve is closed, air pressure in top end 13 of riser pipe 12 will be approximately equal to well pressure (the pressure in well 18 about perforate section 14 of riser pipe 12). Thus, an approximation of well pressure is provided by sensing pressure at top end 13 of riser pipe 12.

The differential pressure sensor will produce a signal indicative of the difference in pressure between the atmosphere and the well. This signal can be input into a control unit 101. When the differential pressure sensor determines that atmospheric pressure is greater than well pressure, the control unit sends a signal to the valve which closes the valve. When the differential pressure sensor determines that atmospheric pressure is less than well pressure, the control unit sends a signal to the valve which opens the valve.

For sensing a pressure differential between well 18 and atmosphere 44, well 18 must be closed. Thus, when the valve is open, pressure differential is detected during spaced apart sampling intervals. During each sampling interval, the valve is closed for a short period (about 10 seconds) until pressure readings stabilize, and a value for pressure differential is obtained.

The differential pressure sensor can be replaced with a pair of pressure sensors. One of the sensors would be in communication with the well (possibly disposed in riser pipe 12) and another sensor would be exposed to atmosphere 44. In this embodiment, two signals (one from each sensor) would be input into a control unit. The control unit would include additional software for determining pressure differential based on the the inputted signals.

Differential pressure can also be determined by installing a single pressure sensor which senses well pressure. The signal from such a sensor is input into a control unit which determines if the valve should be opened based on the value of the signal, on previously received signals from the pressure sensor and on known patterns of pressure differential change.

A mechanical valve, such as a solenoid valve, can be powered by a battery in communication with solar energy collection means which charges the battery. Thus, an entirely passive apparatus can be provided in an embodiment having a mechanical valve requiring power.

As shown in FIG. 4, an embodiment of the invention may include an in-line condenser 58 having an inlet 60 in fluid communication with modified riser pipe. 12a adapted for input into condenser 58, and an outlet 62 in fluid communication with pipe extension 30. Disposed in condenser 58 are means for condensing the gases entering condenser. Such means are well known and may be provided, for example, by a pipe coil having a temperature approximately equal to the air temperature. When apparatus 10 is in use in a cold climate, warm gases exiting riser pipe 12 will condense when they reach condenser 58, and will collect in collection cavity (not shown) formed at the condenser bottom 64. Condensate from the collection cavity can be removed by operating manual valve 66 in fluid communication with the cavity.

Condenser 58 is especially useful when apparatus is to be used in climates wherein cold temperatures below the freezing point are commonly encountered. It is recognized that without condenser 58, water vapor might condense at valve assembly 32. Subsequent freezing of the condensate might freeze ball 42 onto valve seat 40 or add significant weight to ball and render assembly 32 inoperable.

In order to install apparatus 10, a well 18 is first formed in an area of subsurface. Well 18 may be formed by means of drill rig or by means of a cone penetration or by another conventional means. Well 18 is preferably formed to terminate slightly below a target zone or a zone above water table 20. Before or after well 18 is formed, samples of subsurface material may be taken at various elevations in a subsurface to identify zones that are permeable to gas and flow and which contain a high concentration of contaminants. Riser pipe 12 is then inserted into well 18 such that perforations 14 are proximate with a highly contaminated zone of well 18. If more than one highly contaminated zone of well 18 is found, additional riser pipes may be inserted in well 18, or additional perforated sections may be formed in riser pipe 12. When well 18 is formed by means of cone penetration, well diameter may not be large enough to receive additional riser pipes, and thus additional cone penetrations can be formed near the original penetrations to effectively remove contaminants from various levels of the subsurface.

Operation of the apparatus is controlled by fluctuations in atmospheric air pressure. Atmospheric pressure normally fluctuates within about a 30 mbar range and between about 990 mbar and about 1020 mb in locations at sea level. Well pressure, too, will fluctuate within this range. When atmospheric pressure is greater than well pressure, well 18 will be sealed, and no air can enter into well 18 through well head.

Air pressure will be transmitted through a subsurface until well pressure is equal to surface atmospheric pressure. At the point where well pressure and atmospheric pressure are equal, a slight drop in atmospheric pressure will create a pressure drop across valve assembly 32. Ball 42 of valve assembly will then separate from seat 40 to release contaminated air from well into the atmosphere. Contaminated air will continue to flow up and through valve 32 so long as atmospheric pressure continues to drop and so long as there is a pressure drop across valve 32. When atmospheric pressure increases, there will be a pressure increase across valve 32 and valve 32 will close to seal well 18. Air once again will be forced to travel through a subsurface surrounding a well toward well 18 and will once again carry contaminants toward well 18.

The advantages of providing a valve assembly which seals a well during periods of high pressure will be recognized by skilled artisans. If valve 32 were deleted, and apparatus 10 were replaced with riser pipe 12 that was always open, then air, following the path of least resistance, would enter well 18 through riser pipe 12 during periods of high pressure. The air would be forced to travel through the subsurface surrounding the screened zone of the well. With an always open well, air that enters a subsurface during high pressure periods (primarily into well through riser pipe) tends to dilute contaminated air in well 18.

If well 18 is always open, then well pressure rapidly increases as atmospheric pressure increases, and well pressure, a short time after a pressure increase, will be equal to atmospheric pressure. Thus, without apparatus 10, pressure drops between well and atmosphere will be short in duration. While some contaminants will be released from an always-open well 18 during low pressure periods, the amount of contaminants released will be much smaller than they would be if apparatus is in use. If apparatus is in use, a larger area of subsurface is influenced during high pressure periods, and pressure differential between well and atmosphere is utilized effectively to provide for release of contaminants. In the ensuing examples, contaminant release from a well having a apparatus according to the invention is compared with contaminant release from an open well.

EXAMPLE 1

A well having an apparatus according to the invention installed therein was monitored for 15 days. The valve of the apparatus was removed, and the well was monitored for an additional 20 days. Performance of the well before and after removal of the apparatus was compared. Atmospheric air pressure was monitored using a model PTA427 (VAISALA) pressure transducer positioned outside of the well; air flow was monitored using an FM series(OMEGA) air flow detector in communication with the top end of the riser pipe; and concentration of gases flowing from well were measured using a model 1302 (B&K) infrared photoacoustic spectrometer positioned in the valve chamber about an inch above the valve ball. The concentrations of trichloroethylene (TCE) and tetrachloroethylene (PCE) exiting the well were monitored. Data from these transducers were stored on (CAMPBELL) 21X microloggers and periodically downloaded for analysis. The results are shown in FIG. 4. Air pressure fluctuations over time are shown in the top graph, the middle graph shows air flow out of the well, and the bottom graph shows the concentration of TCE and PCE exiting the well.

Comparing, for example, contaminant removal of Day 4 (with valve) with that of Day 25 (open well), it is seen that contaminant removal is much more efficient when the valve according to the invention is installed. Concentrations of PCE and TCE removed from the well both declined by about a factor of 2 when the valve was removed. Without the valve, air from the atmosphere tends to dilute the vapor phase contaminant concentration. Note that contaminant removal performance on Day 18, 3 days after the valve was removed, was much better than on Day 25, 10 days after valve removal. This result was expected since, without the valve, contaminants in the well will become increasingly diluted over time.

EXAMPLE 2

The technique of Example 1 was used except that performance of an open well was first monitored for 10 days, and then a valve was installed and the well monitored for an additional 20 days to observe the effects of installing the valve.

The results are shown in FIG. 6, wherein airflow out of the well is plotted against the concentration of tetrachloroethylene (PCE) exiting the well.

Comparing the results of the exhalation periods on Days 12–15, Days 19–20, Days 23–24, and Days 29–30, it is seen that the concentration of PCE exiting the well generally increased during each successive exhalation period following valve installation. PCE concentration was at a maximum and stabilized at the onset of the exhalation period beginning on Day 29.

The effects of contaminant-dilution owing to air entering the well from the atmosphere become repeatable through time.

EXAMPLE 3

Sampling was performed on 4 wells, three of which were open and one sealed (well 3), by purging the wells with a vacuum pump at between 4 and 4.5 scfm, and measuring concentrations of trichloroethylene (TCE), tetrachloroethylene (PCE) and carbon dioxide using a Model 1302 (BRUEL AND KJAER) gas monitor positioned at the exhaust of the pump. The results are presented in Table 1, wherein sampling time is the time elapsed before the gas concentration stabilized.

Apparatuses in accordance with the invention were then installed in all four wells. After 12 days, the wells were again sampled, this time without purging. Results of sampling the wells after apparatuses were installed are presented in Table 2.

TABLE 1

| Well | Sample Time (hours) | PCE (ppmv) | TCE (ppmv) | CO2 (ppmv) |
|---|---|---|---|---|
| 1 | 1.25 | 2 | 2 | 650 |
| 2 | 0.5 | <1 | <1 | 350 |
| 3 | 1.0 | 2040 | 650 | 4870 |
| 4 | 0.5 | <1 | <1 | 500 |

TABLE 1

| Well | Sample Time (minutes) | PCE (ppmv) | TCE (ppmv) | CO2 (ppmv) |
|---|---|---|---|---|
| 1 | 10 | 470 | 100 | 11,000 |
| 2 | 10 | 37 | 18 | 1,800 |
| 3 | 10 | 7260 | 2430 | 12,900 |
| 4 | 10 | 280 | 107 | 11,200 |

Comparing concentrations of gas sampled before and after installation of the apparatus and sampling time, it is seen that the apparatus facilitates the measurement of actual ambient concentrations in the subsurface. Without the apparatus, concentrations of gas in the well are diluted by airflow into the well during high pressure periods. When extracting gas from the well for characterization and monitoring, it is then necessary to remove the diluted air volume before a representation sample can be taken. The additional time for purging the diluted air from the well adds considerable cost. Installation of the apparatus improves sample accuracy (by providing representative samples immediately) and reduces the time and cost required to obtain a representative sample.

The concentration of gases removed from wells after installation of the apparatus was much higher than that of the wells before installation, despite extensive mechanical purging of the open wells. It is believed that during high pressure periods, airflow through the subsurface directs contaminants toward the wells to produce this result.

Apparatus 10 can be configured to "inject" heat and nutrients into a subsurface to provide bioremediation of a subsurface. Referring to FIG. 7, it is seen that top end 13 of riser pipe 12 may be detached from valve inlet 74, fitted with an elbow 76 and attached to valve top end 50. In this configuration, valve 32 will be open when atmospheric pressure is greater than well pressure and will be closed when atmospheric pressure is less than well pressure. Thus, during periods of high atmospheric pressure, air from atmosphere 44 enters riser pipe 12 and is effectively injected into well 18. During periods of low atmospheric pressure, contaminants are contained to the well.

An apparatus configured for injection can have a mechanical valve requiring a power source and an accompanying control unit as is an apparatus configured for contaminant removal.

Hot air injected into a subsurface will increase the rate at which the contaminants move from the subsurface into the atmosphere, and will increase the rate of biodegradation. When the temperature of atmosphere 44 is greater than that of subsurface 46, apparatus 10 effectively injects heat whenever high pressure periods are encountered. Injection of heat can be enhanced by providing a heating chamber in fluid communication with the valve having heating means disposed therein. Passive heating means for the heating chamber may be provided by solar panels mounted on the chamber.

Bioremediation rate is also increased with the injection of nutrients into the subsurface. During high pressure periods, nutrients including oxygen and nitrogen will be injected into the subsurface 16.

As illustrated in FIG. 7, several apparatuses configured to inject heat and nutrients into a well can be employed in a bioremediation and contaminant removal system. In such a system, a normally-configured apparatus 10 configured to extract contaminants from a subsurface is installed at a center well 80, and one or more apparatuses configured for injection are installed at peripheral wells 82 surrounding center well 80. The apparatuses in peripheral wells 82 inject heat and nutrients into the subsurface during high pressure periods, and direct contaminants toward the center well, which are released through normally-configured apparatus 84 at center well 80.

It will be clear to those skilled in the art to which the present invention pertains from a reading of the foregoing that many changes and substitutions can be made to the preferred embodiments without departing from the spirit and scope of the present invention, which is defined by the appended claims.

What is claimed is:

1. An apparatus for removing contaminants from an area of subsurface, said subsurface having a well formed therein, said apparatus comprising:

a riser pipe having an interior and a first end and an opposing second end, said first end having a perforate section formed thereon, said first end extending into said well and said second end extending upward toward an atmosphere when said riser pipe is inserted in said well, said well having a well pressure; and a valve carried by said second end of said riser pipe, said valve closing when atmospheric pressure above said valve is greater than said well pressure, said valve opening when said well pressure is greater than said atmospheric pressure.

2. The apparatus of claim 1 wherein said valve comprises:

a chamber;

a valve seat formed in said chamber, said valve seat carried by said chamber; and a ball disposed in said valve seat, said ball being sized and having suitable mass such that a pressure drop between said well and said atmosphere lifts said ball from said valve seat.

3. The apparatus of claim 1, wherein said valve comprises:

valve control means disposed in said valve for opening and closing said valve;

a first pressure sensor in communication with atmosphere of said well and responsive to said well pressure;

a second pressure sensor in communication with said atmosphere and responsive to said atmospheric pressure; and control means in electrical connection with said first and second pressure sensors and with said valve control means, said control means for determining pressure differentials between said well pressure and said atmospheric pressure, said control means sending a signal to said valve control means to close said valve when said atmospheric pressure is greater than said well pressure, said control means sending a signal to said valve control means to open said valve when said well pressure is greater than said atmospheric pressure.

4. The apparatus of claim 1, wherein said chamber of said valve further comprises means for visual observation of said valve.

5. The apparatus of claim 1, wherein said chamber of said valve is made of a material that permits operation of said valve to be observed from outside said chamber.

6. The apparatus of claim 1, wherein said chamber of said valve has a window formed therein, whereby operation of an interior of said valve can be observed through said window.

7. The apparatus of claim 1, wherein said valve seat comprises a cone having a bottom end and a top end, said bottom end having a hole formed therein, said hole communicating with said interior of said riser pipe so that particulate matter on said valve seat falls into said riser pipe.

8. The apparatus of claim 1, said apparatus further comprising a condenser having an inlet and an outlet, said inlet in fluid communication with said riser pipe, said outlet in fluid communication with said valve.

9. The apparatus of claim 2, wherein said ball is sized such that a pressure drop between said well and said atmosphere of about 30 mbar or less lifts said ball from said valve seat.

10. The apparatus of claim 2, wherein said ball is sized such that a pressure drop between said well and said atmosphere of about 1 mbar or less lifts said ball from said valve seat.

11. An apparatus for injecting heat and nutrients into an area of subsurface, said subsurface having a well formed therein, said apparatus comprising:

a riser pipe having an interior and a first end and an opposing second end, said first end having a perforate section formed thereon, said first end extending into said well and in communication with said subsurface for introducing heat and nutrients into said subsurface, and said second end extending upward toward an atmosphere when said riser pipe is inserted in said well, said well having a well pressure; and a valve carried by said second end of said riser pipe, said valve opening when atmospheric pressure above said valve is greater than said well pressure, said valve closing when said well pressure is greater than said atmospheric pressure.

12. The apparatus of claim 11, wherein said valve comprises:

a chamber;

a valve seat formed in said chamber, said valve seat carried by said chamber; and a ball disposed in said valve seat, said ball being sized such that a pressure drop between said well and said atmosphere lifts said ball from said valve seat.

13. The apparatus of claim 11, wherein said valve comprises:

valve control means disposed in said valve for opening and closing said valve;

a first pressure sensor in communication with atmosphere of said well and responsive to said well pressure;

a second pressure sensor in communication with said atmosphere and responsive to said atmospheric pressure; and control means in electrical connection with said first and second pressure sensors and with said valve control means, said control means for determining pressure differentials between said well pressure and said atmospheric pressure, said control means sending a signal to said valve control means to open said valve when said atmospheric pressure is greater than said well pressure, said control means sending a signal to said valve control means to close said valve when said well pressure is greater than said atmospheric pressure.

14. The apparatus of claim 11, wherein said chamber of said valve further comprises means for visual observation of said valve.

15. The apparatus of claim 11, further comprising a heating chamber in fluid communication with said interior of said riser pipe, said heating chamber having solar panels disposed therein for heating air in said heating chamber.

16. The apparatus of claim 11, said apparatus further comprising a condenser having an inlet and an outlet, said inlet in fluid communication with said interior of said riser pipe, said outlet in fluid communication with said valve.

17. The apparatus of claim 12, wherein said ball is sized such that a pressure drop between said well and said atmosphere of about 30 mbar or less opens said valve.

18. A method for removing contaminants from a subsurface, said method comprising the steps of:

forming a well in said subsurface so that said contaminants can vent from said subsurface into air in said well, said well having a well pressure;

sealing said well; and opening said well when said well pressure is greater than atmospheric pressure, said vented contaminants exiting said well with said air from said well to equilize said well pressure with said atmospheric pressure, whereby said contaminants are removed from said subsurface.

19. The method as recited in claim 18, further comprising the step of installing a valve in said well to open and seal said well.

20. The method as recited in claim 18, further comprising the step of installing a ball valve in said well to open and seal said well, said ball sized to open said well when the difference between said well pressure and said atmospheric pressure is less than about 30 mbar.

* * * * *